US012590982B2

(12) United States Patent
Fukuda et al.

(10) Patent No.: US 12,590,982 B2
(45) Date of Patent: Mar. 31, 2026

(54) DISPENSING APPARATUS, DISPENSING METHOD, AND COMPUTER-READABLE RECORDING MEDIUM

(71) Applicant: Yokogawa Electric Corporation, Tokyo (JP)

(72) Inventors: Takumi Fukuda, Tokyo (JP); Noriaki Ujiie, Tokyo (JP); Koji Ohashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 288 days.

(21) Appl. No.: 18/211,621

(22) Filed: Jun. 20, 2023

(65) Prior Publication Data

US 2023/0417789 A1 Dec. 28, 2023

(30) Foreign Application Priority Data

Jun. 22, 2022 (JP) ................................. 2022-100580

(51) Int. Cl.
*G01N 35/10* (2006.01)
*B01L 3/02* (2006.01)

(52) U.S. Cl.
CPC ........ *G01N 35/1011* (2013.01); *B01L 3/0293* (2013.01); *G01N 35/1016* (2013.01); *B01L 2200/0642* (2013.01)

(58) Field of Classification Search
CPC ............ G01N 35/1011; G01N 35/1016; B01L 3/0293; B01L 2200/0642
See application file for complete search history.

(56) References Cited

U.S. PATENT DOCUMENTS

| | | | |
|---|---|---|---|
| 4,586,546 A | 5/1986 | Mezei et al. | |
| 2004/0096360 A1 | 5/2004 | Toi et al. | |
| 2016/0236190 A1* | 8/2016 | Kanter ............... | G01N 35/1016 |
| 2018/0172717 A1* | 6/2018 | Hamada ............. | G01N 35/1009 |
| 2023/0184803 A1 | 6/2023 | Sakai et al. | |

FOREIGN PATENT DOCUMENTS

| | | |
|---|---|---|
| CN | 112881739 A | 6/2021 |
| JP | H11287811 A | 10/1999 |
| JP | 2002340915 A | 11/2002 |
| JP | 2004-101294 A | 4/2004 |
| JP | 2004170090 A | 6/2004 |
| JP | 2007078470 A | 3/2007 |

(Continued)

OTHER PUBLICATIONS

WO-2019005744-A1, English Translation (Year: 2019).*

(Continued)

*Primary Examiner* — Ryan D Walsh
(74) *Attorney, Agent, or Firm* — RANKIN, HILL & CLARK LLP

(57) ABSTRACT

A tip 230 holds a liquid and discharges the liquid to a well 310. A dispensing unit 220 performs a dispensing process by discharging a constant dispensing amount of the liquid out of the liquid that is held by the tip 230 to the well 310. An arithmetic unit 10 calculates a dispensing position with respect to the well 310 based on container information on the well 310 and information on the dispensing amount, and causes the dispensing unit 220 to perform the dispensing process at the dispensing position.

12 Claims, 4 Drawing Sheets

(56)            References Cited

FOREIGN PATENT DOCUMENTS

| JP | 2011027480 | A |    | 2/2011 |          |           |
|----|------------|---|----|--------|----------|-----------|
| WO | WO-2019005744 | A1 | * | 1/2019 | .......... | G01F 23/296 |
| WO | WO-2020235134 | A1 | * | 11/2020 | ......... | G01N 35/1016 |
| WO | 2021245989 | A1 |   | 12/2021 |          |           |

OTHER PUBLICATIONS

WO-2020235134-A1, English Translation (Year: 2020).*
Extended European Search Report (EESR) dated Oct. 27, 2023
issued in European patent application No. 23180262.0.
Japanese Office Action (JPOA) dated Jan. 7, 2025 for Japanese
Patent Application No. 2022-100580; English machine translation.
Office Action dated Sep. 16, 2025 and issued for European patent
application No. 23180262.0.

* cited by examiner

FIG.4

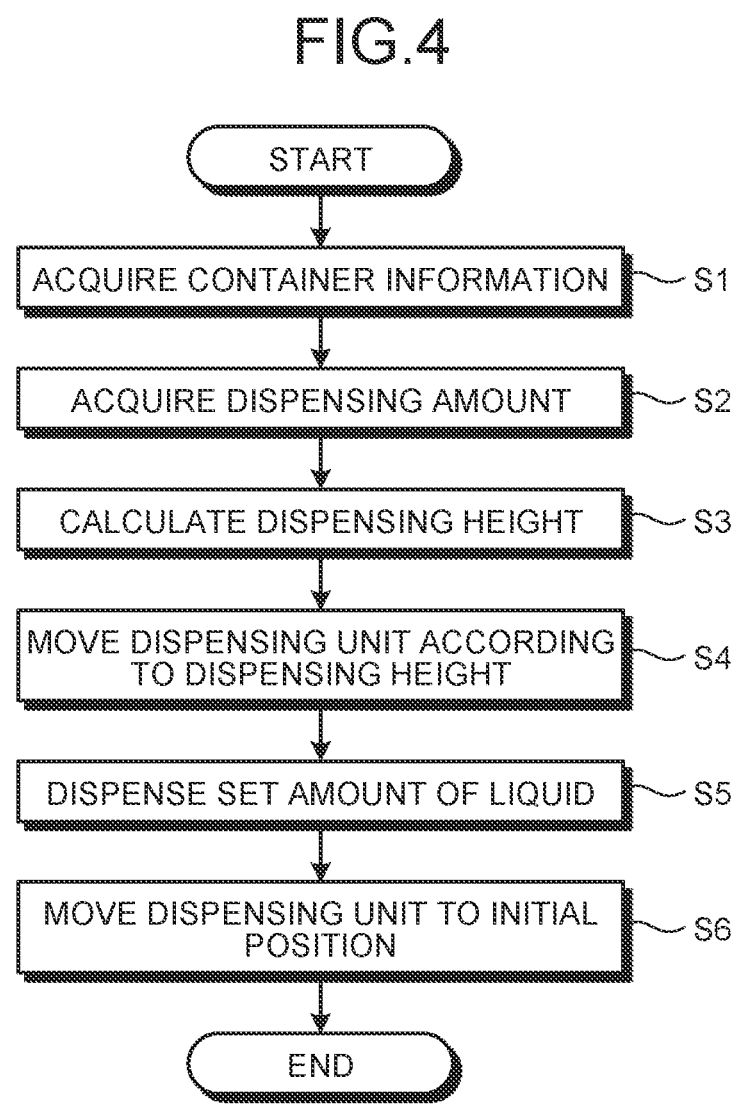

START

ACQUIRE CONTAINER INFORMATION — S1

ACQUIRE DISPENSING AMOUNT — S2

CALCULATE DISPENSING HEIGHT — S3

MOVE DISPENSING UNIT ACCORDING TO DISPENSING HEIGHT — S4

DISPENSE SET AMOUNT OF LIQUID — S5

MOVE DISPENSING UNIT TO INITIAL POSITION — S6

END

DISPENSING APPARATUS, DISPENSING METHOD, AND COMPUTER-READABLE RECORDING MEDIUM

CROSS-REFERENCE TO RELATED APPLICATION

The present application claims priority to and incorporates by reference the entire contents of Japanese Patent Application No. 2022-100580 filed in Japan on Jun. 22, 2022.

FIELD

The present invention relates to a dispensing apparatus, a dispensing method, and a computer-readable recording medium.

BACKGROUND

In various fields, such as the field of medical examination, the field of therapeutic use, and the field of scientific use, a dispensing process is performed by using a dispensing apparatus by sucking a liquid corresponding to a reagent or a sample by using a tip that is provided at a leading end of a dispensing unit and discharging a constant amount of the sucked liquid into a dispensing container.

As a method for performing the dispensing process in this way, there is a method called aerial dispensing that is performed such that a liquid is discharged from an appropriate height. In aerial dispensing, a liquid is discharged from a tip from a constant height regardless of an amount of the liquid contained in the dispensing container. However, in the aerial dispensing, there may be a case in which a liquid droplet remains in the leading end of the tip. For this reason, in the aerial dispensing, the accuracy of dispensing possibly is decreased.

Accordingly, in order to suppress the residue of the liquid droplet remaining at the leading end of the dispensing container, there is a proposed method called liquid level dispensing performed by detecting a liquid surface of a liquid that is already present in a dispensing container and performing a dispensing process in a state in which the tip is brought into contact with the detected liquid surface or in a state in which a certain amount of the tip is inserted. In the liquid level dispensing, in order to determine the height to be set for the dispensing process, the dispensing process is performed by detecting a state in which the leading end of a tip of the dispensing instrument comes into contact with a liquid surface of a dispensing container as a result of using some kind of method for, for example, sensing a change in pressure, and is performed in accordance with the sensed height. As a result, it is possible to suppress the residue of the liquid droplet remaining at the leading end of the tip to some extent, and it is possible to dispense the liquid that is included in the interior of the tip with relatively accuracy as compared to a case of the aerial dispensing (Japanese Patent Publication Laid-open No. 2004-101294).

It is an object of the present invention to at least partially solve the problems in the conventional technology.

In this way, the residue of the liquid droplet remaining at the leading end of the tip is reduced by performing liquid level dispensing, and the variation in the accuracy caused by the liquid droplet is reduced to some extent. However, the height of the liquid surface of the liquid contained in the dispensing container is increased after the dispensing process in accordance with a dispensing amount. In the conventional liquid level dispensing technology, the leading end of the tip is brought into contact with the liquid surface or a certain amount of the leading end of the tip is inserted into the liquid surface, so that almost no liquid droplet remains at the leading end of the tip, a liquid is adhered to an outer surface (mainly, a side surface) of the tip in accordance with a rise in the liquid surface. The dispensing accuracy is possibly degraded caused by a variation in the adhered liquid.

SUMMARY

An object of the disclosed technology is to provide a dispensing apparatus, a dispensing method, and a computer-readable recording medium capable of improving the dispensing accuracy.

According to one aspect of embodiments, a dispensing apparatus includes, a tip that holds a liquid and discharges the liquid to a dispensing container, a dispensing unit that performs a dispensing process by discharging a constant dispensing amount of the liquid out of the liquid held by the tip to the dispensing container, and an arithmetic unit that calculates a dispensing position with respect to the dispensing container based on container information on the dispensing container and information on the dispensing amount, and that causes the dispensing unit to perform the dispensing process at the dispensing position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart of a dispensing process performed by the dispensing apparatus according to a first embodiment;

DESCRIPTION OF EMBODIMENTS

Figure 1:
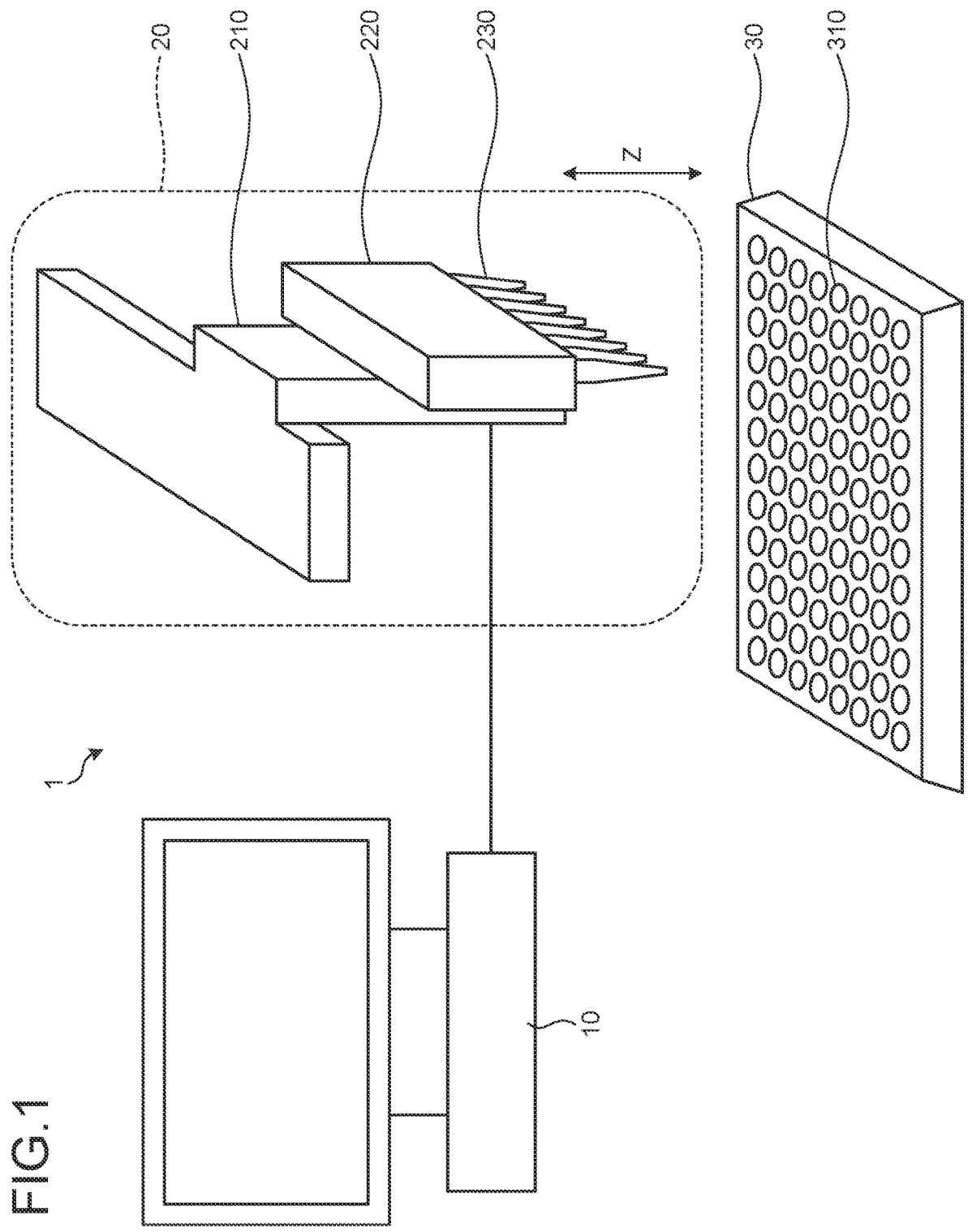
FIG. 1 is an example of the overall configuration of a dispensing apparatus.

Preferred embodiments of a dispensing apparatus, a dispensing method, and a computer-readable recording medium disclosed in the present invention will be described in detail below with reference to the accompanying drawings. Furthermore, the present invention is not limited to the embodiments. In addition, the same components are denoted by the same reference numerals and an overlapping description will be omitted. Each of the embodiments can be used in any appropriate combination as long as they do not conflict with each other.

First Embodiment

Overall Configuration

FIG. 1 is a diagram illustrating an example of the overall configuration of a dispensing apparatus. A dispensing apparatus 1 includes an arithmetic unit 10, a dispensing instrument 20, and a well plate 30.

The well plate 30 is a member having a flat shape with a large number of a wells 310 that are hollows. The well plate 30 is used in a case in which a dispensing operation or the like is performed by using a plurality of specimen materials. On the well plate 30, a liquid is injected in each of the well 310 as a result of a dispensing process performed by the dispensing instrument 20. Each of the wells 310 corresponds to a single piece of a dispensing container.

The dispensing instrument 20 performs the dispensing process with respect to the wells 310 that are provided on the well plate 30. In the present embodiment, the dispensing instrument 20 is able to simultaneously perform the dispensing process with respect to the plurality of wells 310 that are aligned in rows. The dispensing instrument 20 includes a driving unit 210, a dispensing unit 220, and tips 230.

The driving unit 210 is connected to the arithmetic unit 10 so as to receive a control instruction, and has a driving mechanism that moves the dispensing unit 220 in accordance with an instruction received from the arithmetic unit 10. The driving unit 210 moves, by driving the driving mechanism installed in the driving unit 210, the dispensing unit 220 in a direction closer to or away from the well plate 30. In other words, the driving unit 210 moves the dispensing unit 220 in the vertical direction in a state in which the well plate 30 is arranged on a stage or the like. In a description below, the direction closer to or away from the well plate 30, that is, the vertical direction with respect to the surface on which the wells 310 provided on the well plate 30 are provided, is referred to as a "z direction".

In addition, the driving unit 210 is also able to move the dispensing unit 220 in the horizontal directions with respect to the surface on which the wells 310 provided on the well plate 30 are provided, that is, x and y directions with respect to the z direction that corresponds to the vertical direction. For example, in the case where the number of the wells 310 that are provided on a single row is larger than the number of the tips 230 that are provided in the dispensing unit 220 or the like, the driving unit 210 enables the dispensing unit 220 to move in the horizontal direction in addition to the z direction and to perform the dispensing process with respect to an appropriate number of the wells 310.

The dispensing unit 220 is connected to the arithmetic unit 10 so as to receive a control instruction. In addition, the dispensing unit 220 causes the tip 230 to suck a liquid in response to an instruction received from the arithmetic unit 10. In addition, the dispensing unit 220 performs the dispensing process by discharging, from the tip 230, a constant dispensing amount of a liquid out of the liquid obtained by causing the tip 230 to suck in accordance with the instruction received from the arithmetic unit 10.

In addition, the dispensing unit 220 moves in the z direction as a result of the driving mechanism installed in the driving unit 210 being driven. For example, the dispensing unit 220 is moved to a predetermined position in the z direction in accordance with the liquid surface of the well 310 by the driving unit 210 at the time of the dispensing process. Then, the dispensing unit 220 performs the dispensing process by causing the well 310 to discharge, from the position placed after the movement of the dispensing unit 220, the constant dispensing amount of liquid from the tip 230.

The tip 230 is provided at the leading end of the dispensing unit 220 on the well plate 30 side. In other words, the tip 230 is provided at a position located opposite the dispensing container with respect to the dispensing unit 220. The tip 230 sucks, as a result of an operation of the dispensing unit 220, the liquid corresponding to a reagent or a sample into the interior of the tip 230. Then, as a result of an operation of the dispensing unit 220, the tip 230 discharges (drops) the constant dispensing amount of the liquid out of the liquid contained in the interior of the tip 230 to the well 310. Here, in the dispensing process, the tip 230 may discharge a constant dispensing amount, and an amount of the liquid held by the tip 230 may be the same as the dispensing amount, or may be an amount larger than the dispensing amount. Furthermore, in the case where the dispensing process is performed by using the plurality of tips 230, an amount of liquid held by each of the tips 230 may be different. In addition, in the case where the dispensing process is performed with respect to the plurality of wells 310, the dispensing amount to be discharged to each of the wells 310 performed by the associated tips 230 may be different from each other.

The arithmetic unit 10 is implemented by a computer, such as a personal computer. The arithmetic unit 10 controls the driving unit 210 such that the dispensing unit 220 is moved to the position, at which the tip 230 is able to suck a liquid at the time of suction of the liquid, in the z direction. After that, the arithmetic unit 10 instructs the dispensing unit 220 to suck the liquid and causes the tip 230 to suck the liquid.

In addition, the arithmetic unit 10 calculates a height at which the dispensing unit 220 performs the dispensing process in accordance with the liquid surface of the well 310, that is, a position in the z direction. Then, the arithmetic unit 10 controls the driving unit 210 such that the dispensing unit 220 is moved to the calculated position in the z direction. After that, the arithmetic unit 10 instructs the dispensing unit 220 to dispense the constant dispensing amount of liquid, and causes the tip 230 to discharge the dispensing amount of liquid to the well 310.

Here, in FIG. 1, the dispensing apparatus 1 configured to perform the dispensing process with respect to the well plate 30 that includes a large number of wells 310 has been described; however, the dispensing apparatus 1 may perform the dispensing process with respect to a single piece of dispensing container.

Movement Control of Dispensing Unit

Figure 2:
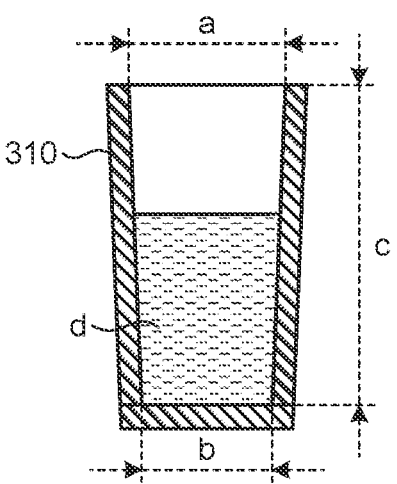
FIG. 2 is a cross-sectional view of a single well in a state in which a liquid is injected.

In the following, movement control of the dispensing unit performed by the arithmetic unit 10 at the time of the dispensing process will be described in detail. FIG. 2 is a cross-sectional view of a single piece of well in a state in which a liquid has been injected. Here, a description will be given as an example in which the dispensing process is performed with respect to a single piece of the well 310.

The well 310 according to the present embodiment has a truncated cone shape in cross section illustrated in FIG. 2. The well 310 is formed such that the diameter of the upper surface is denoted by a length a, the diameter of the bottom surface is denoted by a length b, and a distance from the upper surface to the bottom surface is denoted by a height c. Here, in the well 310 having a truncated cone shape, the diameter of the upper surface mentioned here is the diameter of an opening portion of the well 310 that is used as a containing space for a liquid to be injected from the tip 230 in the case where the dispensing process is performed by using the dispensing apparatus 1. Furthermore, the diameter of the bottom surface mentioned here is the diameter of the surface of the well 310 located on the side opposite to the opening portion of the well 310 that is used as the containing space for the liquid. The distance from the upper surface to the bottom surface mentioned here is the length of the well

310 that is used as the containing space for the liquid in the z direction in the case where the dispensing process is performed by using the dispensing apparatus 1. In addition, here, a liquid amount of the liquid that is already present in the well 310 before the dispensing process is denoted by a volume d. If a liquid is not contained, the volume d=0 holds.

The arithmetic unit 10 acquires, on the basis of an input received from, for example, a user or the like, information on the shape of the well 310 including the length a, the length b, and the height c illustrated in FIG. 2 and container information including the volume d corresponding to a liquid amount of the liquid that is already present in the well 310 before the dispensing process is performed. In addition, the arithmetic unit 10 acquires a dispensing amount on the basis of an input received from, for example, a user or the like. In the following, a description will be given in the case where the dispensing amount is a volume e. In addition, instead of an input directly received from the user, the arithmetic unit 10 may acquire the information on the shape of the well 310 and the dispensing amount that are determined in advance by another device.

Then, the arithmetic unit 10 uses Equation (1) below, and calculates a dispensing position, that is, a dispensing height that corresponds to a position of the leading end of the tip 230, at the time of the dispensing process performed by the dispensing unit 220. In this case, the dispensing height is the distance from the bottom surface of the well 310 that is used as the containing space for the liquid to the leading end of the tip 230 in the z direction. The distance f represented in Equation (1) corresponds to the dispensing height.

$$d + e = \frac{\pi f}{12}\left[b^2 + \left(\frac{a-b}{c}f + b\right)b + \left(\frac{a-b}{c}f + b\right)^2\right] \tag{1}$$

Figure 3:
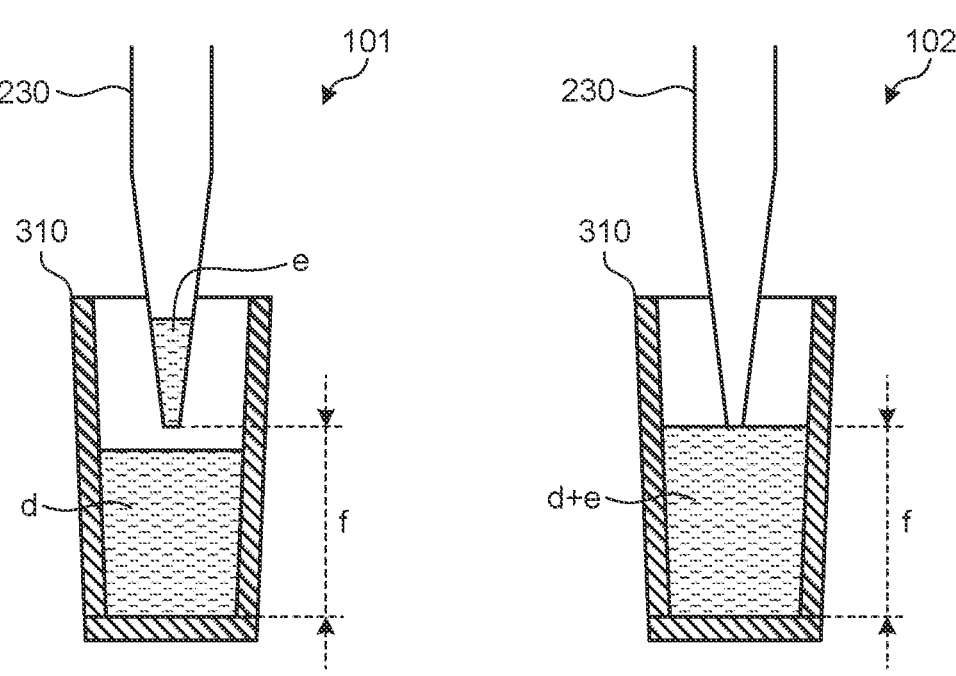
FIG. 3 is a diagram illustrating a relationship between a liquid surface and a tip at the time of a dispensing process.

After that, the arithmetic unit 10 causes the driving unit 210 to move the dispensing unit 220 such that the leading end of the tip 230 is aligned to the position of the dispensing height. FIG. 3 is a diagram illustrating a relationship between a liquid surface and a tip at the time of the dispensing process. A state 101 indicates a state immediately before the dispensing process is started, whereas a state 102 indicates a state immediately after the dispensing process has been completed. The arithmetic unit 10 causes the dispensing unit 220 to move such that, as in the state 101, the leading end of the tip 230 is aligned to the position at which the dispensing height corresponds to the distance f that is calculated by using Equation (1).

After the dispensing unit 220 has been moved, in the state 101 in which the leading end of the tip 230 is positioned at the dispensing height, the arithmetic unit 10 instructs the dispensing unit 220 to drop a liquid with the volume e that corresponds to the dispensing amount. If the dispensing amount corresponding to the instructed volume e is discharged from the tip 230, the well 310 enters the state 102. In this case, an amount of the liquid contained in the well 310 corresponds to the volume d+the volume e and the depth corresponds to the distance f. Therefore, in a state in which the dispensing process has been completed, the leading end of the tip 230 is brought into contact with the liquid surface of the liquid that is contained in the well 310.

After the dispensing process has been completed, the arithmetic unit 10 instructs the driving unit 210 to return the dispensing unit 220 to the initial position that is determined in advance.

Here, in the above, the description has been given in the case where the shape of the well 310 is the truncated cone shape; however, the dispensing apparatus 1 is able to be operated in a similar manner in also a case in which the well 310 has another shape other than the truncated cone shape.

For example, in a case in which the shape of the well 310 is a truncated square pyramid will be described. In this case, the length of the upper surface illustrated in FIG. 3 corresponds to a length of one side of the upper surface of the square opening portion of the well 310. In addition, the length b of the bottom surface corresponds to a length of one side of the bottom surface of the square on a side opposite to a side on which the opening portion of the well 310 that is used as the containing space for the liquid is disposed. In addition, the height c corresponds to a length from the bottom surface to the opening portion of the well 310 that is used as the containing space for the liquid in the z direction.

Then, if the dispensing amount is the volume e, the arithmetic unit 10 calculates the distance f that corresponds to the dispensing height by using Equation (2) below. After that, the arithmetic unit 10 moves the dispensing unit 220 such that the leading end of the tip 230 is positioned at the calculated dispensing height and causes the dispensing unit 220 to perform the dispensing process.

$$d + e = \frac{f}{3}\left[b^2 + \left(\frac{a-b}{c}f + b\right)b + \left(\frac{a-b}{c}f + b\right)^2\right] \tag{2}$$

In addition to this, in also a case in which the shape of the well 310 is another shape other than the truncated cone shape or the truncated square pyramid shape, the arithmetic unit 10 is able to calculate the dispensing height by using an equation to convert the volume of the liquid contained in the well 310 after the dispensing process has been completed to the dispensing height. However, in this case, the arithmetic unit 10 also needs to acquire information on the well 310 that is used to convert the volume to the dispensing height as the container information, in addition to the length of the upper surface of the well 310 and the length and the height of the bottom surface.

Flow of Dispensing Process

FIG. 4 is a flowchart of the dispensing process performed by the dispensing apparatus according to the first embodiment. In the following, the flow of the dispensing process performed by the dispensing apparatus 1 according to the embodiment will be described with reference to FIG. 4.

The arithmetic unit 10 acquires the container information including the length of the upper surface of the well 310, the length and the height of the bottom surface of the well 310, and the amount of liquid that has already been contained in the well 310 (Step S1).

Then, the arithmetic unit 10 acquires the dispensing amount (Step S2).

Then, the arithmetic unit 10 calculates the dispensing height by using the container information and the dispensing amount for Equation (1) (Step S3).

Then, the arithmetic unit 10 instructs the driving unit 210 to move the dispensing unit 220 such that the leading end of the tip 230 is positioned at the calculated dispensing height. The driving unit 210 moves the dispensing unit 220 in accordance with the instruction received from the arithmetic unit 10 such that the leading end of the tip 230 is positioned at the dispensing height (Step S4).

When the movement of the dispensing unit 220 has been completed, the arithmetic unit 10 instructs the dispensing unit 220 to dispense the liquid with a set amount that corresponds to the dispensing amount that has been set in the dispensing unit 220. The dispensing unit 220 performs the dispensing process, in accordance with the instruction received from the arithmetic unit 10, by discharging the liquid with the set amount from the tip 230 toward the well 310 (Step S5).

When the dispensing process has been completed, the arithmetic unit 10 instructs the driving unit 210 to move the dispensing unit 220 to the initial position. The driving unit 210 moves the dispensing unit 220 to the initial position in accordance with the instruction received from the arithmetic unit 10 (Step S6).

<div align="center">Effects</div>

As described above, the dispensing apparatus according to the first embodiment acquires the information on the shape of the well, and the amount of liquid and the dispensing amount of the liquid that has already been contained in the well, and calculates the dispensing height that is the height of the liquid after the dispensing process has been completed by using the acquired information. Then, the dispensing apparatus performs the dispensing process by aligning the leading end of the tip to the position of the calculated dispensing height.

As a result, the dispensing apparatus according to the first embodiment is able to avoid a state in which the tip is soaked in the liquid that is contained in the well at the time of the dispensing process, and is able to reduce the amount of liquid adhered to the outer surface of the tip (mainly, the side surface of the tip). Accordingly, it is possible to improve the dispensing accuracy.

Modification

In the above, the description has been given in the case where the dispensing unit 220 is integrally formed with the driving unit 210 functioning as the driving mechanism that moves the dispensing unit 220; however, there may be sometimes a case in which the driving mechanism for moving the dispensing unit 220 does not belong to the dispensing unit 220. In this case, it is possible to implement the dispensing apparatus 1 by installing the driving mechanism for moving the dispensing unit 220 in the dispensing unit 220, and controlling the driving mechanism by using the arithmetic unit 10. In this way, in a case in which the driving mechanism is installed, the dispensing apparatus 1 is also able to reduce the amount of the liquid adhered to the outer surface of the tip 230 (mainly, the side surface of the tip) after completion of the dispensing process, and is able to improve the dispensing accuracy.

In addition, the dispensing apparatus 1 may also include a suction mechanism for sucking the liquid contained in the well 310 of a washer (plate washer) or the like. In the case where there is a difference between an amount of liquid acquired by the arithmetic unit 10 and a liquid amount of the liquid that is actually present in the well 310, the dispensing apparatus 1 is able to suck the liquid by using the suction mechanism before the completion of the dispensing process, and make the liquid amount of the liquid that is present in the well 310 to agree with the amount of liquid acquired by the arithmetic unit 10. Accordingly, the dispensing apparatus 1 is able to perform the dispensing process at a correct dispensing height, and, as a result, the dispensing apparatus 1 is able to further improve the dispensing accuracy.

In addition to this, in response to an instruction to set the dispensing height to the height of the liquid surface of the liquid that is already present in the well 310 before the completion of the dispensing process, the arithmetic unit 10 may set the height of the liquid surface of the liquid that is already present in the well 310 before the completion of the dispensing process to the dispensing height. The arithmetic unit 10 causes the dispensing unit 220 to perform the dispensing process by moving the dispensing unit 220 such that a leading end portion of the tip 230 is positioned at the liquid surface. In this case, the dispensing accuracy is the same as the liquid level dispensing that is conventionally performed; however, a mechanism for sensing the liquid surface is not needed, and it is thus possible to reduce a cost.

Figure 5:
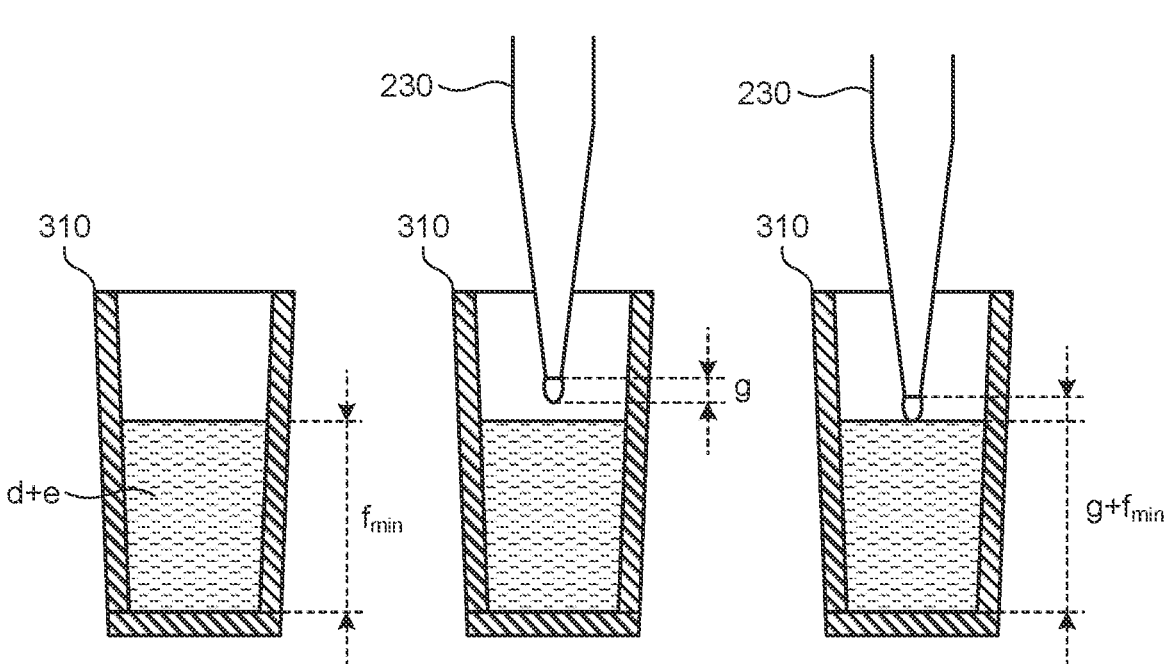
FIG. 5 is a diagram illustrating a dispensing process in the case where a dispensing height has some variations.

In addition, in the above, the description has been given in the case where the distance f that corresponds to the dispensing height is the height in accordance with the liquid amount of the liquid that is present in the well 310 after the dispensing process has been performed; however, in a case in which the dispensing process is performed in the air, the dispensing height may have a range by taking into consideration of the size of a liquid droplet formed at the leading end of the tip 230. FIG. 5 is a diagram illustrating the dispensing process performed in the case where a dispensing height has some variations.

For example, the arithmetic unit 10 calculates the dispensing height in accordance with a liquid amount of the liquid that is present in the well 310 after the dispensing process has been performed and defines the calculated dispensing height as a distance fa illustrated in FIG. 5. In this case, the distance $f_{min}$ agrees with the height of the liquid surface in the case where the liquid is the volume d+the volume e illustrated in FIG. 5.

In addition, the arithmetic unit 10 acquires a length g that is the maximum length of the liquid droplet that is possibly be formed at the leading end of the tip 230 in the case where the dispensing process is performed in the air illustrated in FIG. 5. Here, in general, the length g is able to be calculated from the surface tension of the liquid and the diameter of the tip 230. Accordingly, the arithmetic unit 10 is also able to calculate the length g by acquiring the information on the surface tension of the liquid and the diameter of the tip 230. The length g is, for example, 2 mm to 3 mm. However, there may be a case in which the length of the liquid droplet that is actually formed at the leading end of the tip 230 does not reach the length g that corresponds to the maximum length, and thus, the calculation value obtained by the arithmetic unit 10 is only a rough standard for controlling the position of the dispensing unit 220.

Then, the arithmetic unit 10 moves the dispensing unit 220 such that the leading end of the tip 230 is positioned in the range between the distance $f_{min}$ and the distance $f_{min}+g$, inclusive. In other words, the arithmetic unit 10 moves the dispensing unit 220 such that the leading end of the tip 230 is positioned at the distance f by defining the distance f that corresponds to the dispensing height as $f_{min} \leq f \leq f_{min}+g$. For example, in the case where the dispensing height is $f_{min}+g$, the arithmetic unit 10 moves the dispensing unit 220 such that the leading end of the tip 230 is aligned to the position indicated at the location illustrated on the right side of the plane of the drawing in FIG. 5. After that, the arithmetic unit 10 causes the dispensing unit 220 to perform the dispensing process.

Here, if the distance f corresponding to the dispensing height is in the range of $f_{min} \leq f \leq f_{min}+g$, the leading end of the tip is not soaked into the liquid, and furthermore, it is possible to prevent the liquid droplet from remaining at the leading end of the tip. Accordingly, it is possible to improve the dispensing accuracy.

Second Embodiment

In the following, a second embodiment will be described. The dispensing apparatus 1 according to the present embodiment also has the configuration illustrated in FIG. 1. The dispensing apparatus 1 according to the present embodiment starts the dispensing process by aligning the leading end of the tip 230 to the position of the liquid surface, and performs the dispensing process by raising the tip 230 in accordance with a rise in the liquid surface. In the following, movement control of the leading end of the tip 230 performed in the dispensing apparatus 1 according to the present embodiment will be described. In a description below, a description of the same operation performed by each of the units as that described in the first embodiment will be omitted.

The arithmetic unit 10 acquires the container information and the dispensing amount. Then, the arithmetic unit 10 calculates, as the final dispensing height, the distance f that corresponds to the height of liquid surface of the liquid indicated after the dispensing process has been performed. In addition, the arithmetic unit 10 calculates a distance $f_0$ that corresponds to the liquid surface of the liquid that is present in the well 310 indicated before the dispensing process is performed, and defines the calculated distance as the initial dispensing height. In other words, in the case where the liquid amount of the liquid that is present in the well 310 before the dispensing process is performed is denoted by the volume d, and the dispensing amount is denoted by the volume e, the distance $f_0$ corresponds to the height of the liquid surface of the liquid in the case where the amount of liquid is the volume d, whereas the distance f corresponds to the height of the liquid surface of the liquid in the case where the amount of liquid is the volume d+the volume e.

Then, the arithmetic unit 10 acquires a dispensing speed that indicates an amount of the liquid dropped per unit of time. Then, the arithmetic unit 10 calculates a rising speed of the liquid surface per unit of time by using the container information and the dispensing speed.

Then, the arithmetic unit 10 moves the dispensing unit 220 such that the leading end of the tip 230 is positioned at the distance $f_0$ that corresponds to the calculated initial height. Then, the arithmetic unit 10 causes the dispensing unit 220 to start the dispensing process. Then, the arithmetic unit 10 causes the dispensing unit 220 to perform the dispensing process while moving the dispensing unit 220 such that the position of the leading end of the tip 230 is raised in accordance with a rising speed of the calculated liquid surface. After that, if the position of the leading end of the tip 230 reaches the distance f that corresponds to the final dispensing height, the arithmetic unit 10 causes the dispensing unit 220 to end the dispensing process.

In other words, the arithmetic unit 10 causes the dispensing unit 220 to perform the dispensing process while causing the leading end of the tip 230 to follow the liquid surface by changing the dispensing height from the initial dispensing height to the dispensing completion height such that the state of the liquid level dispensing is maintained in accordance with the dispensing speed.

As described above, the dispensing apparatus according to the present embodiment performs the dispensing process while moving the leading end of the tip such that the state of the liquid level dispensing is maintained. As a result, it is possible to perform the dispensing process in a state in which the leading end of the tip is brought into contact with or approaches the liquid surface, and it is thus possible to reduce the amount of the liquid adhered to the outer surface of the tip (mainly, the side surface of the tip). Accordingly, it is possible to further improve the dispensing accuracy.
System The flow of the processes, the control procedures, the specific names, and the information containing various kinds of data or parameters indicated in the above specification and drawings can be arbitrarily changed unless otherwise stated.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Figure 6:
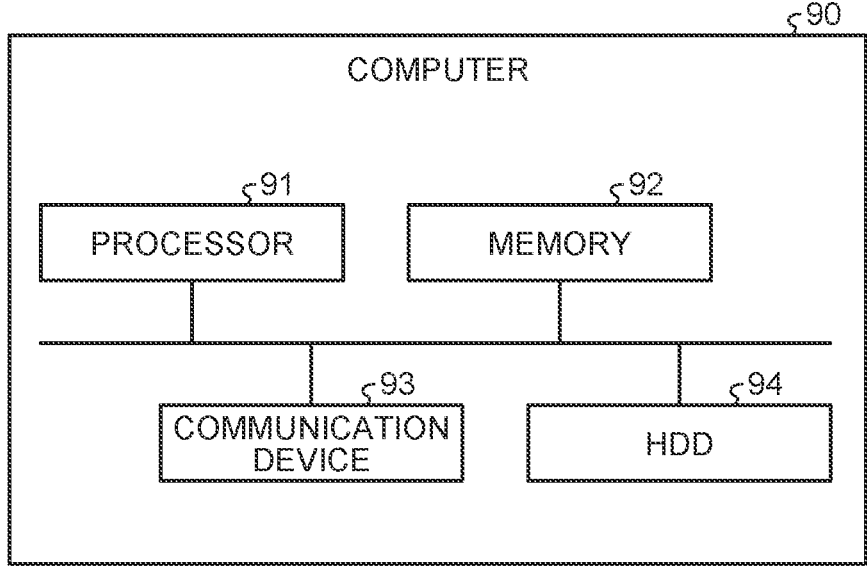
FIG. 6 is a diagram illustrating a hardware configuration of a computer.

Furthermore, all or any part of each of the processing functions performed by the each of the devices can be implemented by a central processing unit (CPU) and by programs analyzed and executed by the CPU or implemented as hardware by wired logic.
Hardware In the following, an example of a hardware configuration of the arithmetic unit 10 described in the embodiment will be described. FIG. 6 is a diagram illustrating an example of a hardware configuration of a computer. The arithmetic unit 10 is able to be implemented by a computer 90 including the units illustrated in, for example, FIG. 6. The computer 90 includes a processor 91, a memory 92, a communication device 93, and a hard disk drive (HDD) 94. In addition, the processor 91 is connected to the memory 92, the communication device 93, and the HDD 94 via a bus.

The communication device 93 is a network interface card or the like, and is used to communicate with another information processing apparatus. For example, the communication device 93 relays communication between the processor 91 and the driving unit 210 and the dispensing unit 220.

The HDD 94 is an auxiliary storage device. The HDD 94 stores therein various programs including the program for implementing the function of the arithmetic unit 10.

The processor 91 reads the various programs stored in the HDD 94, and executes the program by loading the read program in the memory 92. As a result, the processor 91 implements the function of the arithmetic unit 10.

In this way, the computer 90 is operated as an information processing apparatus that performs various processing methods by reading and executing the programs. Furthermore, the computer 90 is also able to implement the same functions as those described above in the embodiment by reading the above described programs from a recording medium by a medium reading device and executing the read programs. In addition, the programs described in another embodiment are not limited to be executed by the computer 90. For example, the present invention may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

Some examples of a combination of disclosed technological features will be described below.

According to an aspect of one embodiment, the present invention is able to improve the dispensing accuracy.

(1) A dispensing apparatus comprising:
   a tip that holds a liquid and discharges the liquid to a dispensing container;
   a dispensing unit that performs a dispensing process by discharging a constant dispensing amount of the liquid out of the liquid held by the tip to the dispensing container; and
   an arithmetic unit
      that calculates a dispensing position with respect to the dispensing container based on container information on the dispensing container and information on the dispensing amount, and
      that causes the dispensing unit to perform the dispensing process at the dispensing position.

(2) The dispensing apparatus according to (1), further comprising a driving unit that moves the dispensing unit such that a distance with respect to the dispensing container is changed, wherein
   the tip is provided at a position opposite the dispensing container at the time of the dispensing process performed by the dispensing unit, and
   the arithmetic unit moves the tip by causing the driving unit to move the dispensing unit.

(3) The dispensing apparatus according to (2), wherein the driving unit is able to be attached to and removed from the dispensing unit.

(4) The dispensing apparatus according to any one of (1) to (3), wherein
   the arithmetic unit
      acquires the container information including a shape of the dispensing container and a liquid amount of the liquid that is already present in the dispensing container,
      calculates, based on the shape of the dispensing container, the liquid amount of the liquid that is already present in the dispensing container, and the dispensing amount, a position of a liquid surface of the liquid in the dispensing container after the dispensing process as the dispensing position, and
      moves the tip such that a leading end of the tip is positioned at the dispensing position.

(5) The dispensing apparatus according to (4), wherein the arithmetic unit calculates the dispensing position by using an equation to convert the liquid amount of the liquid that is present in the dispensing container to the dispensing position.

(6) The dispensing apparatus according to any one of (1) to (5), wherein
   the arithmetic unit
      determines a dispensing position range in a direction away from the dispensing position with respect to the dispensing container based on a size of a liquid droplet formed at a leading end of the tip when the tip discharges the liquid in the air, and
      moves the tip in the dispensing position range.

(7) The dispensing apparatus according to any one of (1) to (6), wherein
   the arithmetic unit
      acquires the container information including a shape of the dispensing container and a liquid amount of the liquid that is already present in the dispensing container, calculates, based on the shape of the dispensing container and the liquid amount of the liquid that is already present in the dispensing container, a position of a liquid surface of the liquid in the dispensing container before the dispensing process as the dispensing position, and
   moves the tip such that a leading end of the tip is positioned at the dispensing position.

(8) The dispensing apparatus according to any one of (1) to (7), wherein
   the arithmetic unit
      acquires the container information including a shape of the dispensing container and a liquid amount of the liquid that is already present in the dispensing container, wherein
   the dispensing apparatus further comprises
      a suction device that sucks the liquid that is present in the dispensing container and that adjusts the liquid that is already present in the dispensing container to the liquid amount acquired by the arithmetic unit.

(9) The dispensing apparatus according to any one of (1) to (8), wherein
   the arithmetic unit
      acquires
         the container information including a shape of the dispensing container and a liquid amount of the liquid that is already present in the dispensing container, and
         information on a dispensing speed indicating a discharge amount of the tip per unit of time,
      calculates an initial position of a liquid surface of the liquid in the dispensing container before the dispensing process based on the shape of the dispensing container, the liquid amount of the liquid that is already present in the dispensing container, and the dispensing amount,
      obtains, based on the dispensing speed and the initial position, a position of the liquid surface of the liquid in the dispensing container changed in accordance with a discharge of the liquid from the tip as the dispensing position,
      causes the dispensing unit to start the dispensing process at the dispensing position, and
      causes the dispensing unit to perform the dispensing process at the dispensing position that has been changed in accordance with the discharge of the liquid from the tip.

(10) A dispensing method that causes a computer to execute a process comprising:
   calculating a dispensing position with respect to a dispensing container based on container information on the dispensing container that contains a liquid discharged from a tip that holds the liquid and information on a constant dispensing amount of the liquid to be discharged to the tip;
   moving the tip to the dispensing position; and
   performing a dispensing process by discharging the dispensing amount of the liquid out of the liquid that is held by the tip to the dispensing container.

(11) A computer-readable recording medium having stored therein a dispensing program that causes a computer to execute a process comprising:
   calculating a dispensing position with respect to a dispensing container based on container information on the dispensing container that contains a liquid discharged from a tip that holds the liquid and information on a constant dispensing amount of the liquid to be discharged to the tip;

moving the tip to the dispensing position; and performing a dispensing process by discharging the dispensing amount of the liquid out of the liquid that is held by the tip to the dispensing container.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dispensing apparatus comprising:

a tip that holds a liquid and discharges the liquid to a dispensing container;

a dispensing unit that performs a dispensing process by discharging a constant dispensing amount of the liquid out of the liquid held by the tip to the dispensing container; and an arithmetic unit that calculates a dispensing position with respect to the dispensing container based on container information on the dispensing container and information on the dispensing amount, the dispensing position being a position of a liquid surface of the liquid in the dispensing container after the dispensing process, and that causes the dispensing unit to perform the dispensing process at the dispensing position.

2. The dispensing apparatus according to claim 1, further comprising a driving unit that moves the dispensing unit such that a distance with respect to the dispensing container is changed, wherein the tip is provided at a position opposite the dispensing container at the time of the dispensing process performed by the dispensing unit, and the arithmetic unit moves the tip by causing the driving unit to move the dispensing unit.

3. The dispensing apparatus according to claim 2, wherein the driving unit is able to be attached to and removed from the dispensing unit.

4. The dispensing apparatus according to claim 1, wherein the arithmetic unit acquires the container information including a shape of the dispensing container and a liquid amount of the liquid that is already present in the dispensing container, calculates, based on the shape of the dispensing container, the liquid amount of the liquid that is already present in the dispensing container, and the dispensing amount, the position of the liquid surface of the liquid in the dispensing container after the dispensing process as the dispensing position, and moves the tip such that a leading end of the tip is positioned at the dispensing position.

5. The dispensing apparatus according to claim 4, wherein the arithmetic unit calculates the dispensing position by using an equation to convert the liquid amount of the liquid that is present in the dispensing container to the dispensing position.

6. The dispensing apparatus according to claim 1, wherein the arithmetic unit determines a dispensing position range in a direction away from the dispensing position with respect to the dispensing container based on a size of a liquid droplet formed at a leading end of the tip when the tip discharges the liquid in the air, and moves the tip in the dispensing position range.

7. The dispensing apparatus according to claim 1, wherein the arithmetic unit acquires the container information including a shape of the dispensing container and a liquid amount of the liquid that is already present in the dispensing container, calculates, based on the shape of the dispensing container and the liquid amount of the liquid that is already present in the dispensing container, a position of a liquid surface of the liquid in the dispensing container before the dispensing process as the dispensing position, and moves the tip such that a leading end of the tip is positioned at the dispensing position.

8. The dispensing apparatus according to claim 1, wherein the arithmetic unit acquires the container information including a shape of the dispensing container and a liquid amount of the liquid that is already present in the dispensing container, wherein the dispensing apparatus further comprises a suction mechanism that sucks the liquid that is present in the dispensing container and that adjusts the liquid that is already present in the dispensing container to the liquid amount acquired by the arithmetic unit.

9. The dispensing apparatus according to claim 1, wherein the arithmetic unit acquires the container information including a shape of the dispensing container and a liquid amount of the liquid that is already present in the dispensing container, and information on a dispensing speed indicating a discharge amount of the tip per unit of time, calculates an initial position of a liquid surface of the liquid in the dispensing container before the dispensing process based on the shape of the dispensing container, the liquid amount of the liquid that is already present in the dispensing container, and the dispensing amount, obtains, based on the dispensing speed and the initial position, a position of the liquid surface of the liquid in the dispensing container changed in accordance with a discharge of the liquid from the tip as the dispensing position, causes the dispensing unit to start the dispensing process at the dispensing position, and causes the dispensing unit to perform the dispensing process at the dispensing position that has been changed in accordance with the discharge of the liquid from the tip.

10. The dispensing apparatus according to claim 1, wherein the arithmetic unit moves the tip to the dispensing position before the dispensing process, and keeps the tip in the dispensing position during the dispensing process.

11. A dispensing method that causes a computer to execute a process comprising:

calculating a dispensing position with respect to a dispensing container based on container information on the dispensing container that contains a liquid discharged from a tip that holds the liquid and information on a constant dispensing amount of the liquid to be discharged to the tip, the dispensing position being a position of a liquid surface of the liquid in the dispensing container after the dispensing process;

moving the tip to the dispensing position; and performing a dispensing process by discharging the dispensing amount of the liquid out of the liquid that is held by the tip to the dispensing container.

12. A computer-readable recording medium having stored therein a dispensing program that causes a computer to execute a process comprising:

calculating a dispensing position with respect to a dispensing container based on container information on the dispensing container that contains a liquid discharged from a tip that holds the liquid and information on a constant dispensing amount of the liquid to be discharged to the tip, the dispensing position being a position of a liquid surface of the liquid in the dispensing container after the dispensing process;

moving the tip to the dispensing position; and performing a dispensing process by discharging the dispensing amount of the liquid out of the liquid that is held by the tip to the dispensing container.

* * * * *